Feb. 3, 1942. W. G. BROWN Re. 22,015

LUBRICATION APPARATUS

Original Filed March 17, 1939 3 Sheets-Sheet 1

WILEY G. BROWN
Inventor

By

Attorney

Feb. 3, 1942. W. G. BROWN Re. 22,015

LUBRICATION APPARATUS

Original Filed March 17, 1939 3 Sheets-Sheet 2

WILEY G. BROWN
Inventor

By

Attorney

Feb. 3, 1942. W. G. BROWN Re. 22,015
LUBRICATION APPARATUS
Original Filed March 17, 1939 3 Sheets-Sheet 3
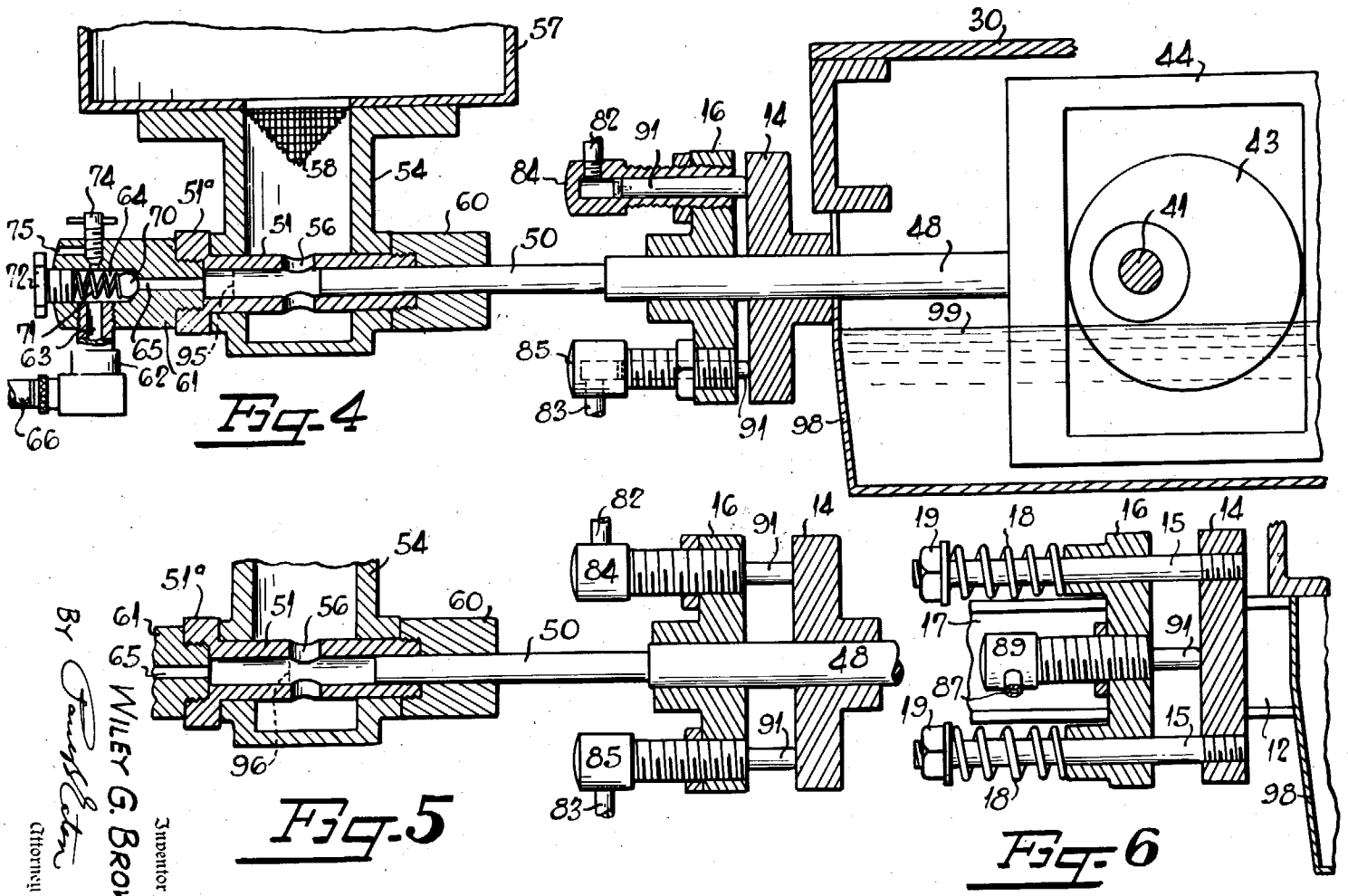
Inventor:
WILEY G. BROWN
By Paul B. Eaton
Attorney Reissued Feb. 3, 1942

Re. 22,015

UNITED STATES PATENT OFFICE 22,015

LUBRICATION APPARATUS

Wiley G. Brown, Charlotte, N. C., assignor to William Y. Brown and Robert H. Garland Original No. 2,234,229, dated March 11, 1941, Serial No. 262,471, March 17, 1939. Application for reissue September 19, 1941, Serial No. 411,603

3 Claims. (Cl. 103—37)

This invention relates to a lubricating apparatus for forcing grease, or other liquid substances from a container to the point of dispensation. While it is particularly adapted for use in applying lubricant to the fittings of automobiles, it is to be understood that the same principle may be employed where it is desired to pump any fluid material while maintaining a constant pressure in the delivery hose, regardless of whether or not any of the material is being dispensed therefrom.

It is, therefore, an object of this invention to provide a continuously driven pump having means associated therewith for building up and maintaining a predetermined pressure in the delivery hose regardless of whether or not any of the material is being expelled from the hose. More specifically, the invention relates to the combination of a grease or lubricant container, a delivery hose, a cylinder and a piston mounted for reciprocation in the cylinder, together with hydraulic means controlled by the pressure in the hose for rendering the stroke in the piston ineffective when a predetermined pressure has been reached. It is a well known fact that heretofore pressure has been maintained at a constant or predetermined point in the delivery hose by using by-pass arrangements. A by-pass is very objectionable because the flow of the grease or lubricant continues while the driving means reciprocates the piston; consequently the lubricant or other material which is being pumped, is damaged or its condition altered by this constant flow. In the present form of the invention, this is not the case, because when the predetermined pressure is reached within the hose, this increased pressure is partially used for shortening the effective stroke of the piston, and when the pressure reaches a predetermined point the length of the effective stroke will be zero. At this point, no grease will be pumped.

It is another object of this invention to provide a pressure feed pump having maximum safety and economy in the use of pressure fluid; the provision of a dependable pump of the class described, which is rugged in construction and simple in operation having a minimum number of parts and therefore adapted to be economically manufactured.

Some of the objects of the invention having been stated, other objects will appear as the description proceeds, when taken in connection with the accompanying drawings, in which—

Figure 4 is an enlarged longitudinal sectional view taken along the line 4—4 in Figure 2;

Figure 5 is an enlarged longitudinal sectional view similar to Figure 4, but showing the parts in a position where the stroke of the piston is rendered ineffective;

Figure 6 is an enlarged vertical sectional view taken along the line 6—6 in Figure 2, showing the parts in the position where the stroke is rendered ineffective.

Figures 2, 3:
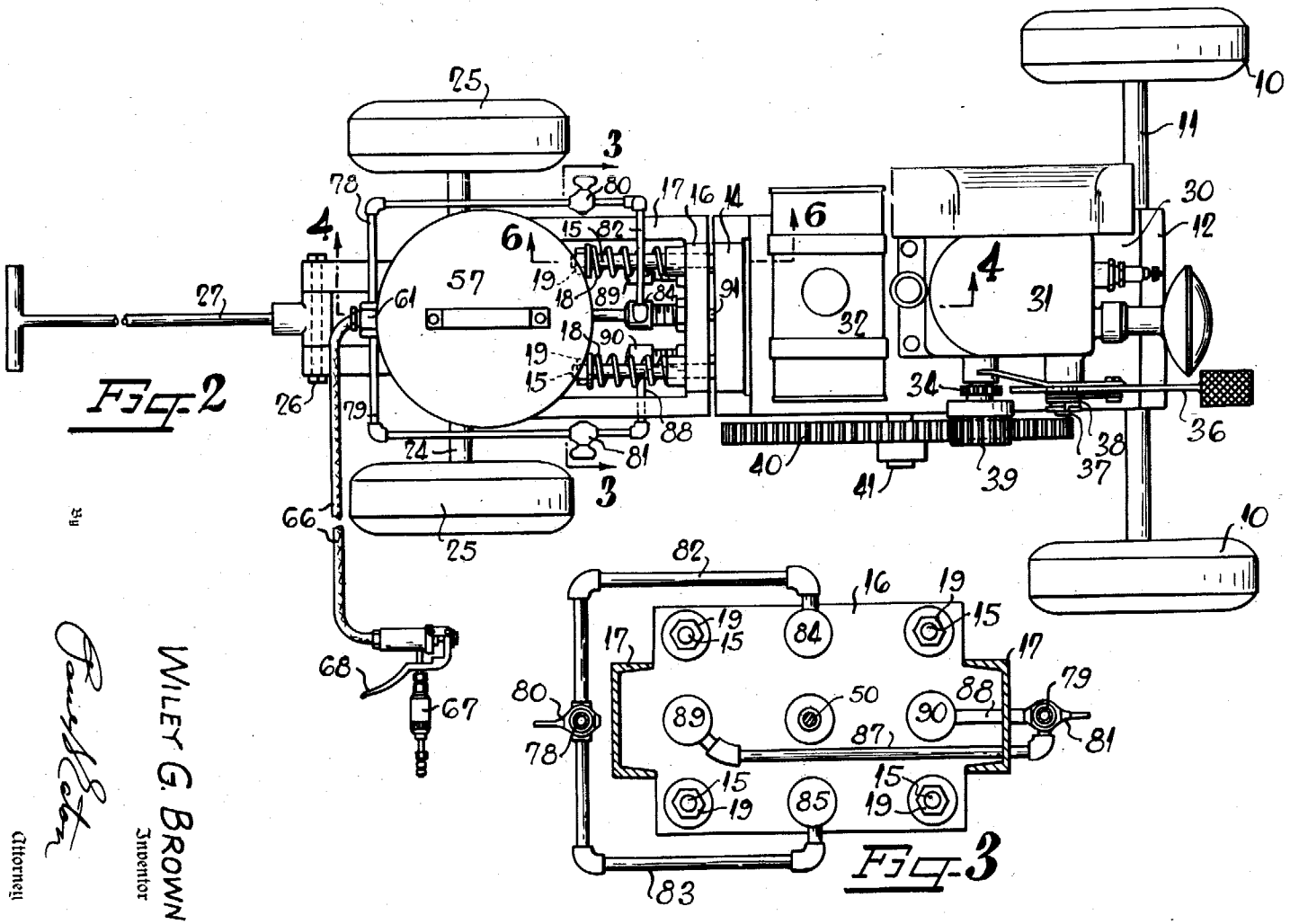
Figure 2 is a plan view of Figure 1.
Figure 3 is a transverse vertical sectional view taken along the line 3—3 in Figure 2.

Referring more specifically to the drawings, the numeral 10 denotes the rear wheels of a portable lubrication apparatus, said wheels being mounted on the ends of a rear axle 11. The intermediate portion of the axle 11 supports one end of a frame 12, and this frame has a header plate 14 secured to its other end in which a plurality of elongated bolts 15 are threadably secured (Figures 2 and 6). The bolts 15 are also slidably mounted in a header plate 16 which is secured to the right hand end of another frame 17. Each of these bolts has a compression spring 18 confined therearound by means of a suitable nut 19. These compression springs normally tend to force the proximate faces of header plates 14 and 16 together in the manner shown in Figure 2. The bolts 15 also act as a connecting means between the frames 12 and 17.

The extreme left hand end of frame 17 has a plate 20 secured to the lower side thereof, to which is pivoted, as at 21, a caster 22. In order to make it possible for the caster to rotate easily about pivot point 21, suitable balls 23 are disposed between the lower side of plate 20 and the upper side of caster 22. The lower end of the caster 22 is supported by the intermediate portion of front axle 24 and this axle has suitable front wheels 25 on each end thereof. Pivoted to the caster 22 as at 26 is also a tongue 27 for pulling or pushing the connected frames 12 and 17 from place to place.

The rear framework 12 has a platform 30 mounted thereon which, in turn, supports a motor 31 and a fuel tank 32. This motor may be of any conventional type but in the present instance, it is a gasoline or internal combustion engine. It is equipped with a drive shaft 33 having a starting pinion 34 mounted thereon which pinion is engaged by a toothed segment 35 on lever 36 when it is necessary to start the motor. Lever 36 is pivoted as at 37 and a suitable torsion spring 38 normally holds the lever and rack in a disengaged position when not in use.

Figure 1:
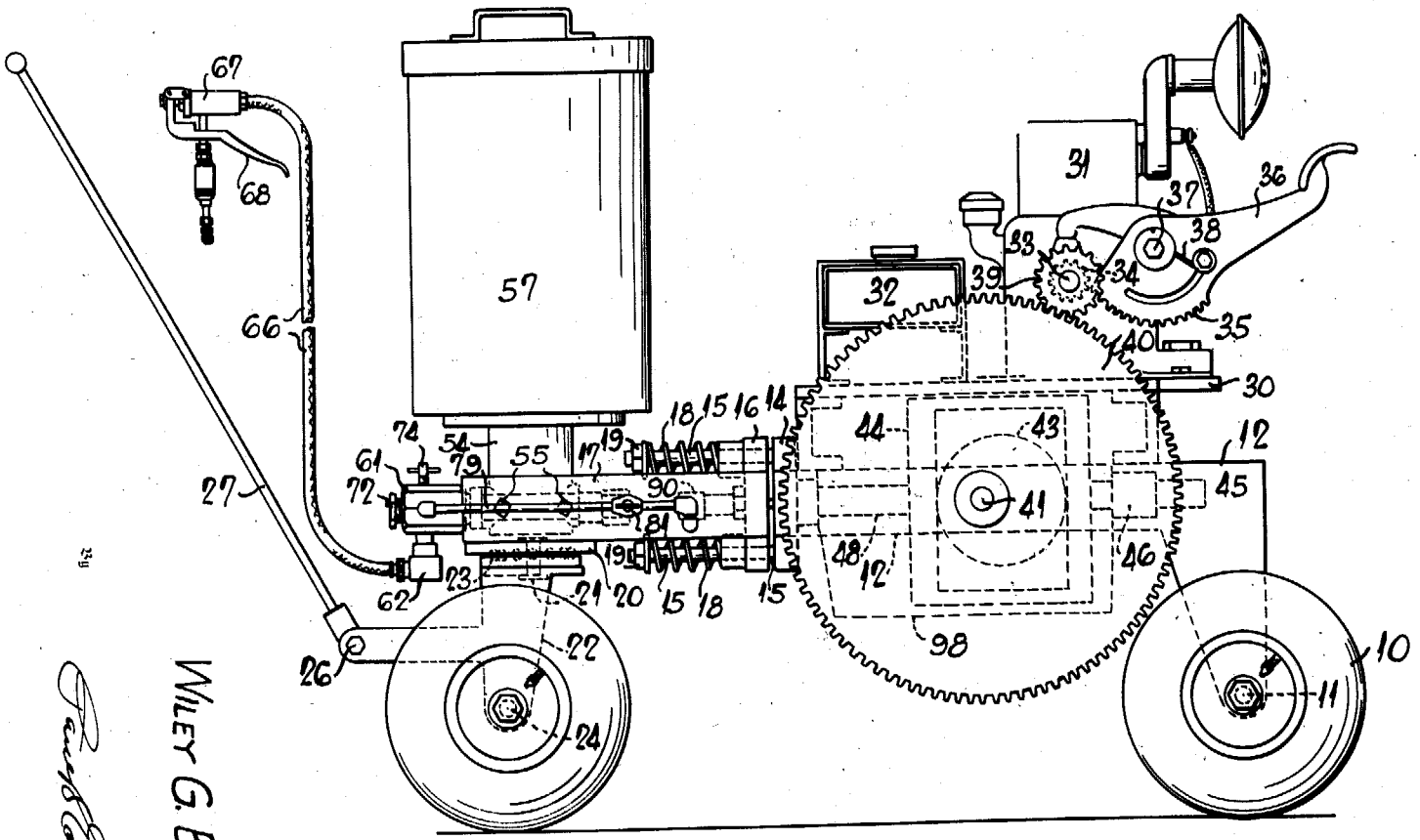
Figure 1 is an elevation of my invention.

Another pinion 39 is fixedly secured on shaft 33, which pinion meshes with a relatively large gear 40 on eccentric shaft 41. Eccentric shaft 41 is rotatably mounted in the rear framework 12 and has fixedly secured on the central portion thereof an eccentric cam 43, which cam is surrounded by a scotch yoke 44, said scotch yoke having a projecting shaft 45 integral with one side thereof which is mounted for reciprocation in bearing 46 (Figure 1). Integral with the other side of scotch yoke 44 in another shaft 48 which is in direct alinement with the shaft 45 and has a piston 50 secured to the extreme left-hand end thereof (Figures 4 and 5). The extremity of piston 50 reciprocates within a cylinder 51, which is mounted in the lower end of container bracket 54, said bracket 54 being secured to the front portion of framework 17 by any suitable means such as stud bolts 55.

It will be noted that the cylinder 51 has a plurality of transverse bores 56 disposed therein, through which grease or other fluid substance is allowed to enter from the interior of the bracket 54. The upper end of the bracket 54 normally supports a container 57 and this container has a suitable strainer 58 in its bottom for straining the material that is subsequently forced into the interior of the cylinder 51 (Figure 4).

In order to properly secure the cylinder 51 in the lower end of bracket 54, an enlarged head portion 51*a* has been provided on the left-hand end thereof (Figures 4 and 5). The cylinder also has been provided with a threaded portion on its right hand end which projects beyond the exterior of the bracket. On this threaded portion, a suitable nut 60 is secured, which nut is adapted to surround the intermediate portion of piston 50.

Threadably secured in the enlarged head portion 51*a* is a fitting 61, said fitting having another fitting 62 threadably secured therein which has a bore 63 therein. The bore 63 communicates with bore 64 within fitting 61, said bore communicating with a restricted bore 65 within the same fitting, which, in turn, communicates with the interior of cylinder 51. The lower end of the fitting 62 has a hose or conduit 66 secured thereto and this hose has a suitable dispensing apparatus 67 secured to its other end for applying the plastic material or lubricant to a suitable fitting. When it is desired to open the valve to allow the lubricant or other material to flow from the hose 66, a suitable lever 68 is pressed.

In order to prevent the pressure in the hose from returning to the interior of the cylinder 51, a check valve is provided comprising a ball 70 which is disposed in bore 64 directly over the left-hand end of restricted bore 65 (Figure 4). This ball is normally pressed over this bore by means of a suitable compression spring 71, which spring is held within the bore 64 by means of nut 72.

Means have been provided for relieving air pockets which form in the grease or other stiff material comprising a screw 74 which is disposed in L-shaped bore 75, said bore acting as a passageway through which the pocketed air can escape. When it is desired to release the pocketed air, it is only necessary to manipulate the screw 74 to open the passageway 75.

By observing Figures 1, 2 and 3, it will also be noted that the fitting 61 has leading therefrom suitable pipes 78 and 79, both of said pipes leading from the bore 64 on the interior of the fitting. These pipes have suitable valves 80 and 81 disposed therein and at a point beyond these valves the pipes are forked (Figure 3). The pipe 78 is forked into two branches, namely, 82 and 83, which, in turn, lead to hydraulic cylinders 84 and 85, respectively. Likewise, the pipe 79 is forked into branches 87 and 88, which, in turn, communicate with hydraulic cylinders 89 and 90, respectively. The cylinders 84, 85, 88 and 89 are similar in all respects, each having a plunger 91 slidably mounted therein with the right-hand end thereof normally abutting one face of the header plate 14 on the rear framework 12. By providing the members 79 to 91, inclusive, the pressure which is present within the hose 66 and in the bore 64, is transmitted to the hydraulic cylinders 84, 85, 88 and 89 and to plungers 91. When the pressure has been raised to a predetermined point within the hose, the plungers 91 will force the rear framework 12 away from the front framework 17 and thereby decrease the effective stroke of the pumping piston 50 which reciprocates in the cylinder 51. For example, when there is no pressure within the hose and within the bore 64, the springs 18 will normally force the two sections or frames 12 and 17 together to the position shown in Figures 1, 2 and 4; whereas, when the pressure has been built up in the hose and bore, the corresponding pressure will be transmitted to plungers 91 and against the plate 14 to separate these sections. Due to the fact that the right hand end of the assembly comprising piston 50 and shaft 48 is supported by the scotch yoke 44, and since this scotch yoke is mounted around the eccentric 43 on shaft 41, it is evident that as the plate 14 or frame 12 is moved to the right, the piston will be moved along with it. Therefore, the distance that the left-hand end of the piston 50 reciprocates within the cylinder 51 will be lessened, accordingly. In other words, when there is no pressure the sections 12 and 17 are together as shown in Figure 4. At this time the position of the left-hand end of the piston 50 at the stroke extremities is designated by the dotted line 95 and the bold line position of the end of the piston 50. It is seen that the position 95 of the end of the piston is somewhat to the left of the peripheral bores 56; consequently, the grease which enters the cylinder 51 through those bores will be expelled through bore 65 and into the hose 66. However, when considerable pressure has been built up in the hose and the two sections are separated in the position shown in Figure 5, the positions of the end of the piston 50 at the stroke extremities will be the dotted line 96 and the bold line position of the end of this piston 50. At this time, it is seen that the left hand end of the piston in its reciprocation does not penetrate any of the interior of cylinder 51 to the left of the bores 56; consequently while the pressure is built up in the hose, no grease will be forced out of this piston and into the hose, but nevertheless the engine will continue to run and the piston will continue to reciprocate. Of course when grease or other liquid substances is dispensed through the dispensing apparatus 67, the pressure will be relieved in the hose, a proportionate amount to allow the two sections 12 and 17 to move toward each other, at which time, the left hand-end of the piston 50 will be allowed to reciprocate in an effective manner to pump material to build up the pressure within the hose.

The predetermined pressure at which the stroke of piston 50 is rendered ineffective may be varied by cutting off one of the valves 80 or 81 as well as by tightening or loosening the nuts 19 on the ends of bolts 15. If one of the valves 80 or 81 is cut off, then only two hydraulic cylinders will supply force for separating the frameworks 12 and 17, therefore, a much higher pressure will be necessary within the hose to render the stroke of the piston ineffective. The tightening of nuts 19 compresses springs 18 which likewise tends to raise the pressure necessary to render the piston stroke ineffective.

In order to keep the scotch yoke 44 properly lubricated, a suitable lubricant container 98 has been provided which has lubricant 99 therein, said lubricant being adapted to surround the lower portion of the eccentric and the scotch yoke.

One great advantage in this type of construction is the provision of a unit that can be operated by a low horse power engine. Due to the variable stroke one is able to pump a large volume from cylinder 59 at a low pressure and a small volume at high pressure. In other words, the load on the motor remains substantially constant but when increased pressure is encountered, the stroke is automatically shortened thus making it possible to start under high pressure with a low horsepower motor or engine.

In the drawings and specification, there has been set forth a preferred embodiment of the invention, and although specific terms are employed, they are used in a generic and descriptive sense only and not for purposes of limitation, the scope of the invention being set forth in the following claims.

I claim:

1. Lubrication apparatus comprising a framework having a housing for containing a lubricant and having a pump cylinder disposed horizontally in the bottom portion of the housing, said cylinder having at least one perforation for establishing communication between the interior of the housing and the interior of the cylinder, a discharge conduit connected to one end of the cylinder, a second framework having a prime mover thereon, and having a reciprocating piston slidably mounted in the second frame and driven by the prime mover and extending into the cylinder, a pair of rods on one frame slidably penetrating portions of the other frame, spring means on the rods for forcing the two frames towards each other, pressure operated means disposed between the frames, and a piped connection between the discharge side of the pump cylinder and the pressure operated means for moving the two frames apart from each other against the pressure of the spring means as the pressure increases in the discharge end of the pump cylinder to thereby lessen the distance the piston travels in the pump cylinder.

2. Lubrication apparatus comprising a first frame and a second frame arranged end to end, the first frame having projections thereon slidably mounted in the proximate end of the second frame, spring means urging the proximate ends of the frames against each other, a motor mounted on the first frame, a piston slidably mounted in said first frame and having a driving connection with the motor, a lubricant pump mounted on the second frame into which the piston projects, a delivery hose for the pump, a pressure cylinder mounted on the second frame and having a slidable piston engaging the first frame, a piped connection between the delivery hose and the pressure cylinder whereby as the pressure is built up in the delivery hose, the piston in the pressure cylinder is moved to move the two frames away from each other in direct proportion to the amount of pressure in the delivery hose to thereby move the pump away from the first-named piston to thereby shorten the stroke of the pump piston and decrease the output of the pump.

3. Lubrication apparatus comprising first and second frames disposed end to end, the proximate ends of the frames being connected together for movement to and from each other, said connection comprising a pair of pins mounted in one frame and slidably penetrating holes in the other frame, each of the pins having a compression spring confined thereon for holding the two frames in end to end relation, a motor fixedly mounted on the first frame, a reciprocating piston mounted on the first frame and projecting over the other frame, a driving connection between the motor and piston, the second frame having a lubricant pump thereon of which the piston is a part, a pressure cylinder mounted on the second frame and being connected to the outlet side of the pump, a plunger in the pressure cylinder projecting against the first frame, whereby as pressure is built up by the pump, the plunger will move the frames apart against the force of the compression springs to shorten the distance the piston travels in the pump in direct proportion to the amount of pressure built up by the pump.

WILEY G. BROWN.